US00RE40934E

(19) United States
(12) Reissued Patent
Ruud et al.

(10) Patent Number: US RE40,934 E
(45) Date of Reissued Patent: Oct. 13, 2009

(54) BOLLARD LUMINAIRE

(75) Inventors: Alan J. Ruud, Racine, WI (US); Eric J. Haugaard, Kenosha, WI (US)

(73) Assignee: Ruud Lighting, Inc., Racine, WI (US)

(21) Appl. No.: 11/122,213

(22) Filed: May 4, 2005

Related U.S. Patent Documents

Reissue of:
(64) Patent No.: 5,105,347
Issued: Apr. 14, 1992
Appl. No.: 07/694,504
Filed: May 2, 1991

(51) Int. Cl.
*F21S 8/00* (2006.01)

(52) U.S. Cl. ..... 362/268; 362/153.1; 362/300; 362/346

(58) Field of Classification Search ..... 362/431, 362/152, 153, 560, 410–414, 268, 158, 186, 362/153.1, 187, 190, 255, 298, 300, 346
See application file for complete search history.

(56) References Cited

U.S. PATENT DOCUMENTS

| | | | | |
|---|---|---|---|---|
| 1,248,688 | A | | 12/1917 | Ludescher |
| 1,877,785 | A | | 9/1932 | Andrews |
| 1,883,803 | A | | 10/1932 | Martin, Jr. |
| 1,904,248 | A | | 4/1933 | Pixley et al. |
| 2,191,379 | A | * | 2/1940 | Glasgow ..... 362/216 |
| 3,264,463 | A | | 8/1966 | Bonner, Jr. |
| 3,634,675 | A | * | 1/1972 | Madsen et al. ..... 362/303 |
| 4,004,132 | A | | 1/1977 | Glass et al. |
| 4,591,960 | A | | 5/1986 | Jones |
| 4,739,456 | A | | 4/1988 | Little |
| 4,740,874 | A | | 4/1988 | Wylie et al. |

OTHER PUBLICATIONS

Edison Price Corp., Engineering drawing of Bollard Luminaire (bears date Sep. 1, 1981).

* cited by examiner

*Primary Examiner*—Sandra L. O'Shea
*Assistant Examiner*—Gunyoung T. Lee
(74) *Attorney, Agent, or Firm*—Jansson Shupe & Munger Ltd.

(57) ABSTRACT

The improved bollard luminaire has an upwardly directed, elliptical main reflector and a lamp "nested" within such reflector and positioned at or near its lower focal point. An upper cone-shaped reflector receives light from the main reflector and directs it laterally through a transparent lens element. Such element provides a 360° lateral light opening unobstructed by wiring, support posts or the like. Light reflected through such opening is relatively sharply focused along an axis about 70° from vertical. Unreflected light from the lamp which "misses" both reflectors also provides a degree of "uplighting," often found useful for aesthetic purposes.

22 Claims, 4 Drawing Sheets

BOLLARD LUMINAIRE

Matter enclosed in heavy brackets [ ] appears in the original patent but forms no part of this reissue specification; matter printed in italics indicates the additions made by reissue.

FIELD OF THE INVENTION

This invention relates generally to lighting devices for area illumination and, more particularly, to bollard luminaires.

BACKGROUND OF THE INVENTION

It is believed that bollard luminaires are so named because in shape they tend to resemble the bollards, i.e., posts, used at wharfs and around which mooring lines are fastened. Bollard luminaires provide ground (or floor) level illumination over a relatively large area. In some instances, bollard luminaires provide only "up-lighting" for illuminating ceilings which themselves reflect a portion of such light.

Bollard or bollard-type luminaires are shown in several patents including U.S. Pat. No. 4,041,305 (Dean) which shows a bollard-type luminaire using one-way reflective glass. Such luminaire uses four radial, reflective baffles and a lamp positioned generally in line with the light opening.

U.S. Pat. No. 4,768,139 (Poppenheimer) shows a ground stake mounted luminaire in which the lamp is positioned above a cone-shaped reflector and below a "mushroom-shaped" reflector. At least a significant portion of the light appears to be projected directly outward from the luminaire without being reflected. In another embodiment, much of the light is reflected outward by a curved reflector cup.

The luminaire shown in U.S. Pat. No. 3,646,338 (Goytisolo) uses a system of prisms and reflectors to direct light. Some light from the lamp emerges generally downward from the luminaire without contacting a prism or reflector. Other light is directed through a prism, yet other light is both reflected and directed through a prism while some light is only reflected from the top concave reflector.

The fixture shown in U.S. Pat. No. 4,787,018 (Poyer) uses a U-shaped fluorescent tube to produce light which radiates directly outward through a cylindrical frosted lens. No reflective or prismatic features are shown.

The optical system shown in U.S. Pat. No. 4,591,960 (Jones) uses four angled reflective surfaces to direct light from the lamp generally downward to the surrounding area. Such surfaces are arranged so that the lamp is not seen (or, perhaps, only barely seen) by passers-by. Reflected rays are concentrated to define a relatively "sharp" lobe.

The bollard luminaire shown in U.S. Pat. No. 4,438,484 (Winden) uses a resilient mount within the housing and impact resistant windows to help protect the luminaire against vandalism. The lamp is positioned adjacent the light openings and no reflectors are used. The light opening(s) provide a light pattern extending less than 360° around the luminaire.

U.S. Pat. No. 4,447,864 (Smith et al.) shows a post-top luminaire with a cylindrical refractor-type lens and a top cover which is apparently translucent. The lamp is positioned adjacent the light opening and the lens and cover are held in place by fastener rods.

The luminaire shown in U.S. Pat. No. 4,231,080 (Compton) uses several stacked reflectors, some of which are concave, to direct light outward in a pattern of varying intensity, depending upon the angle at which such intensity is measured. The lamp appears to be exposed to the atmosphere.

U.S. Pat. Nos. 4,229,782 (Ruud et al.) and 4,386,392 (Reibling) show what appear to be indoor bollard luminaires for providing uplighting toward a ceiling.

While such bollard luminaires have been generally satisfactory, they have certain disadvantages. For example, the luminaires shown in the Dean, Winden and Smith et al. patents all have some sort of light-obstructing structure which interferes with uniform projection of light in a 360° pattern about the luminaire. Others, like those shown in the Goytisolo, Jones and Compton patents use a lamp exposed to the environment. At the least, such lamp is thereby much more prone to damage by vandals and, perhaps, by cold blowing snow or rain.

Other luminaires provide area lighting at ground level but include no provision for uplighting useful to softly highlight foliage or architectural features. See, for example, the luminaires shown in the Dean, Peppenheimer, Goytisolo, Jones, Winden and Compton patents and, probably, the Poyer patent. Others like those shown in the Reibling and Ruud et al. patents provide only uplighting.

The bollard luminaire shown in the attached Gardeo Lighting catalog mount the lamp socket, lamp and (necessarily) some wiring in the upper cover of the luminaire. At least the wiring tends to block passage of light and the lamp seems especially susceptible to being damaged by striking the top of the luminaire.

And, of course, any bollard luminaire having areas around the lamp and reflector to which insects can gain access will, over time, deteriorate in output. Such deterioration is due to "specking" and/or to the pile-up of insect bodies around the lamp and reflective surface.

An improved bollard luminaire which avoids or minimizes such disadvantages would be an important advance in the art.

OBJECTS OF THE INVENTION

It is an object of the invention to overcome some of the problems and shortcomings of the prior art.

Another object of the invention is to provide an improved bollard luminaire which provides illumination in an unobstructed 360° pattern.

Another object of the invention is to provide an improved bollard luminaire which minimizes susceptibility to vandalism.

Yet another object of the invention is to provide an improved bollard luminaire which provides omnidirectional ground illumination over a broad area.

Still another object of the invention is to provide an improved bollard luminaire which provides a degree of uplighting.

Another object of the invention is to provide an improved bollard luminaire which is substantially insect-proof.

Another object of the invention is to provide an improved bollard luminaire which is substantially prevents the entry of water into vital lamp and reflector areas.

SUMMARY OF THE INVENTION

The improved bollard luminaire includes a 360° lateral light opening and an upwardly directed main reflector having a top rim below such opening. A lamp is positioned below the top rim of the main reflector. A cone-shaped upper reflector receives and reflects light from the main reflector and such light is thereby directed laterally through such opening.

More particularly, the main reflector is preferably elliptical and has an upper focal point and a lower focal point. The upper reflector has a surface of revolution of a straight line. The lateral light opening has an annular upper edge and the upper reflector has an periphery substantially aligned with the upper edge of the light opening. Light reflected from the main reflector is reflected upward, strikes the upper reflector and is reflected laterally outward from such upper reflector. The reflected, laterally directed light is greatest at an angle of about 70° from vertical, thereby providing illumination over a broad 360° area.

The upper focal point of the main [reflect] *reflector* is positioned above such upper reflector so that light from the main reflector is received on the upper reflector in an area called the convergence area. In a preferred embodiment, the lamp is substantially at the lower focal point of the main reflector and when the improved luminaire is so constructed, the convergence area on the upper reflector is ring-like in shape.

A one-piece unobstructed lens element defines the lateral light opening and has a light-occluding coated top. Since exposed coatings, e.g., paint, are subjected to the elements and to abuse from passers-by, such coating is preferably on the upper interior surface of the lens element to protect the coating from physical damage. A preferred lens element is made of clear, high impact resistant polycarbonate plastic material. Such material includes an ultraviolet (UV) inhibitor to protect the coating from fading.

A primary purpose of bollard luminaires is to illuminate nearby sidewalks, grassy areas and the like. However, in many situations, "uplighting" is also desired to softly illuminate architectural features or foliage above the luminaire. Accordingly, the main reflector, the upper reflector, the lamp and the lens element of the improved bollard luminaire are configured and arranged such that some light emitted by the lamp "misses" or passes the upper reflector and exits the luminaire at the upper portion of the light opening.

The improved bollard luminaire also has a number of other innovative features. For example, such luminaire includes a tubular housing having an upper or first lip. The electrical fixtures, e.g., the lamp and its socket, wiring and associated circuitry, are located within the housing and below the first lip. The lateral light opening is above such housing so that light directed toward the opening is unobstructed by electrical wiring. Since the path between the light and the opening is not blocked by such wiring or, for that matter, by support pins or the like, light is emitted by the luminaire at a generally uniform intensity over a 360° area. And because the electrical fixtures are positioned within the housing, they are well protected from vandalism.

Insects are invariably attracted to luminaires of all types. Unless special precautions are taken, such insects may migrate to and pile up around the lamp and within the main reflector. Unless regularly cleaned out, such insects diminish the light output of the luminaire, are aesthetically unattractive and (under the right conditions) might even cause a fire hazard. In the improved luminaire, a resilient, double-lipped barrier is provided between the housing and the main reflector whereby insects are denied access to the light-reflecting surface of the main reflector as well as to the lamp and its socket cavity.

Another potential problem attending the use of luminaires outdoors is water in the form of rain or melted snow or sleet. To prevent water damage, the lens element of the improved luminaire has a second lip along the first lip of the housing and such lips are in water-tight sealing engagement, thereby preventing entry of water. The second lip preferably includes a retainer ring bonded to the lens element and positioned to overlap the housing lip when the lens element is assembled to the housing. When so constructed, water flowing down the vertical side of the lens element flows over the retaining ring and off of such ring at locations below the housing lip. For added protection against water entry, the sealing engagement of the lens element and the housing is made redundant by a resilient seal captured between the lips.

Further details regarding the new bollard luminaire are set forth below.

DETAILED DESCRIPTION OF THE PREFERRED EMBODIMENTS

Figure 1:
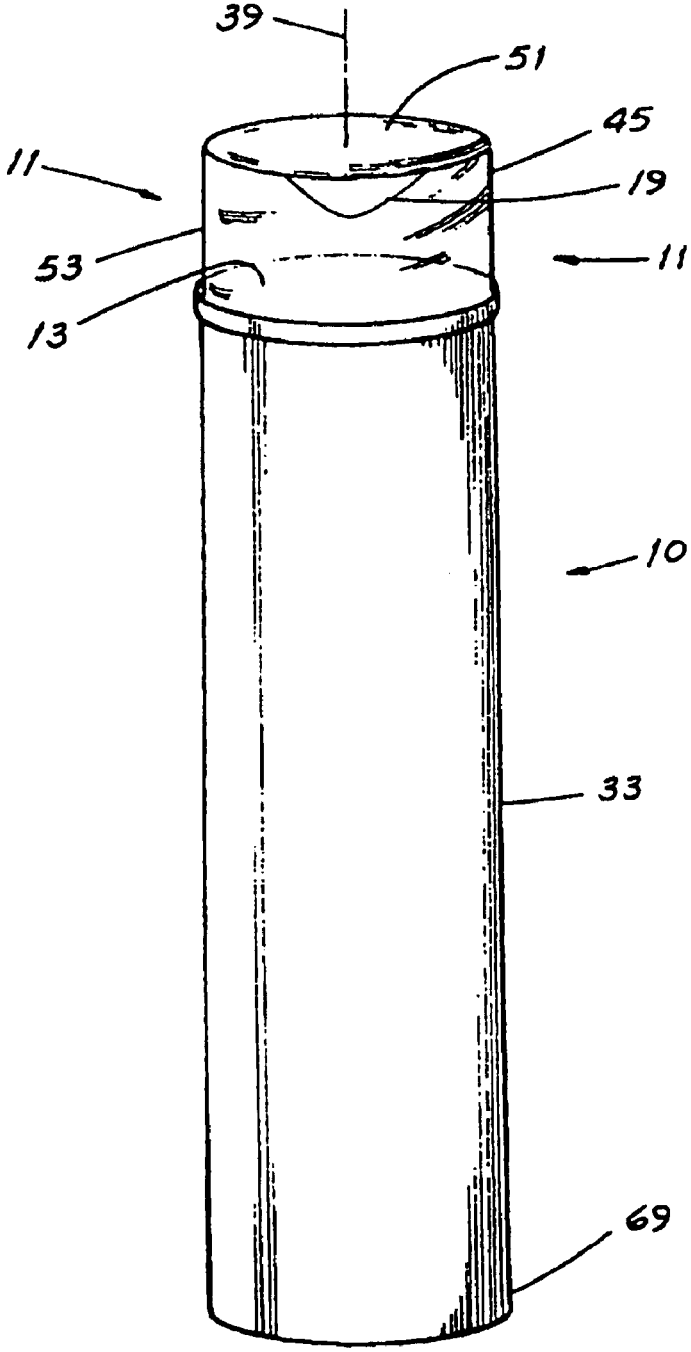
FIG. 1 is an elevation perspective view of the improved bollard luminaire.
Figure 2:
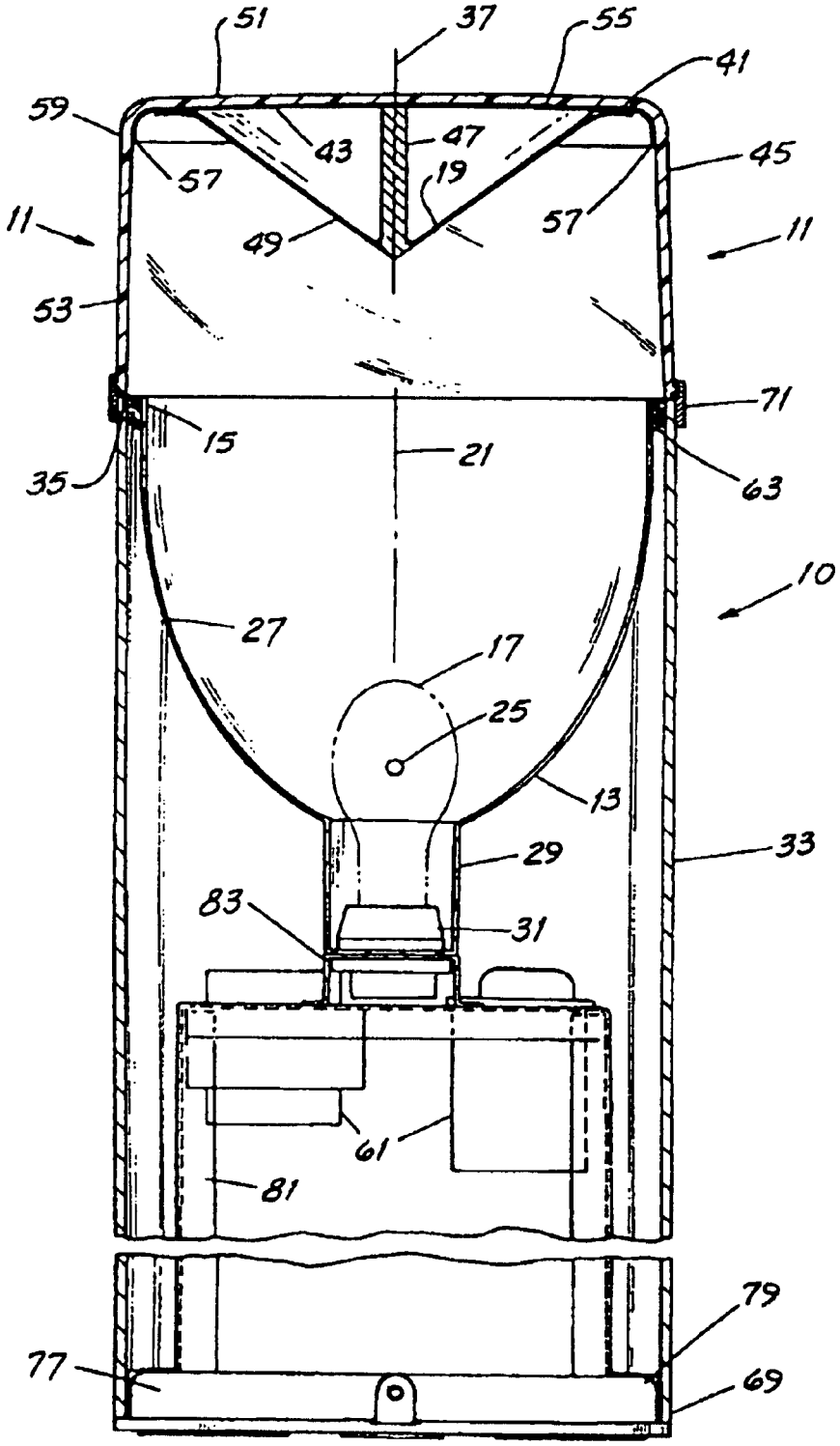
FIG. 2 is a cross-sectional side elevation view of the luminaire of FIG. 1 taken along a plane coincident with the central vertical axis thereof, with portions shown in dotted outline.

Referring first to FIGS. 1 and 2, the improved bollard luminaire 10 includes a 360° lateral light opening 11 and an upwardly directed main reflector 13 having a top rim 15 below such opening 11. A lamp 17 is positioned below the top rim 15 of the main reflector 13. A cone-shaped upper reflector 19 receives and reflects light from the main reflector 13 and such light is thereby directed laterally through such opening 11.

Figure 4:
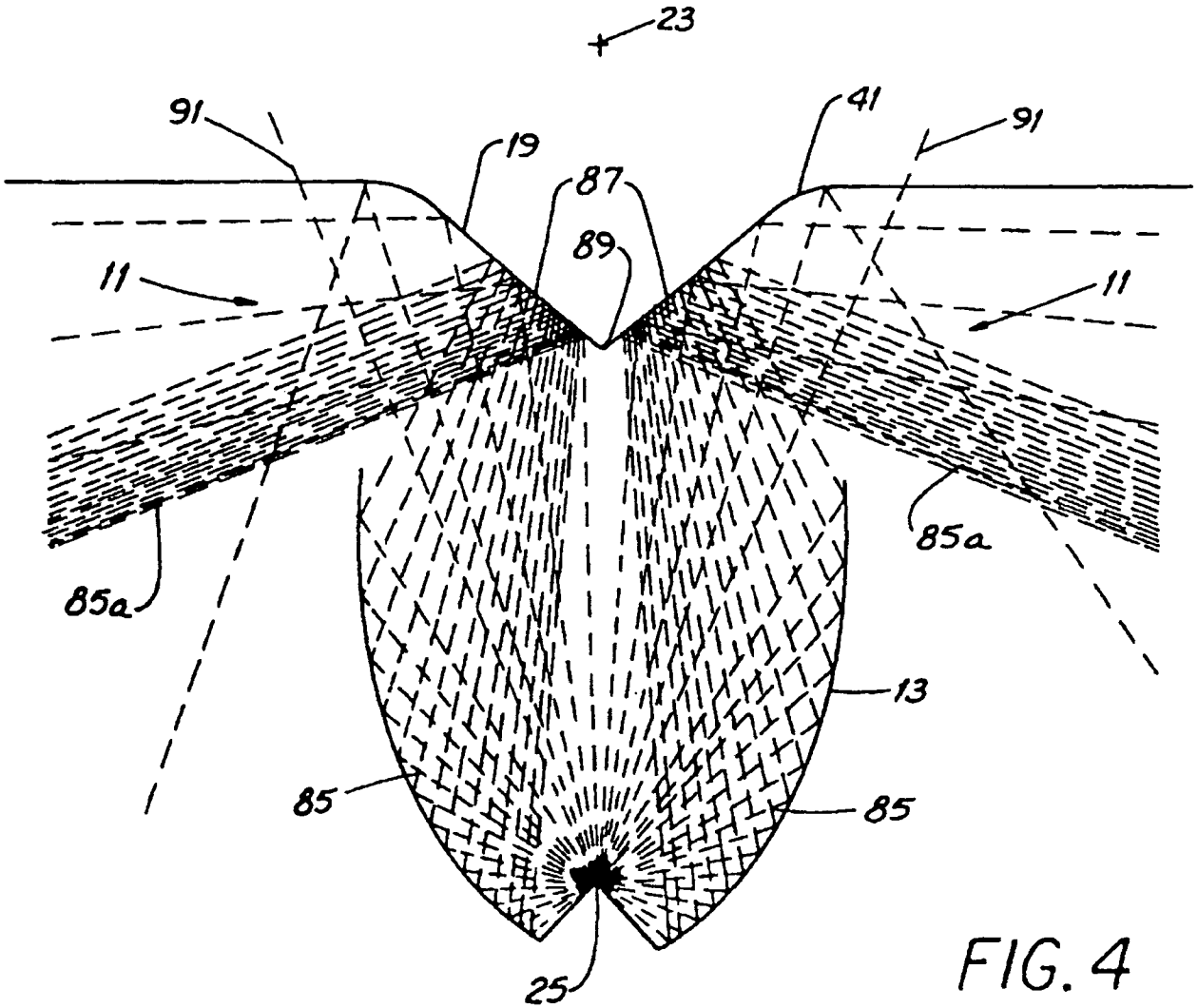
FIG. 4 is a representative ray trace of the luminaire of FIG. 1.

More particularly, the main reflector 13 is preferably elliptical, symmetrical about its vertical major axis 21 and, as shown in FIG. 4, has an upper focal point 23 and a lower focal point 25. The interior reflective surface 27 of the main reflector 13 is carefully formed to an elliptical shape and is highly specular for maximum light reflection.

Near its lower end, the reflector 13 includes a downwardly extending tubular portion 29 within which is mounted a socket 31 and the lamp 17. The position of the socket 31 is preferably selected so that the light-emitting portion of the lamp 17 is at or very near the lower focal point 25. When installed in the housing 33, the top rim 15 of the reflector 13 is substantially aligned with the first or upper lip 35 of such housing 33. When so positioned, the lamp 17 is invisible to passers-by except, perhaps, from a vantage point almost directly above the luminaire 10. Because of the invisibility of such lamp 17, it does not present what might be a tempting "target" to passing vandals.

The cone-shaped upper reflector 19 has a surface of revolution of a straight line and has a central vertical axis of symmetry 37. And the axes of symmetry 21, 37 of the reflectors 13, 19 are coincident with one another and with the central longitudinal axis 39 of the luminaire 10.

The upper reflector [119] *19* has a somewhat-flared periphery 41 which bears against (or is at least adjacent) the interior surface 43 of the lens element 45 when the reflector 19 is mounted. Mounting is by a support post 47 attached to a molding sprue extending downward from such interior surface 43. That is, the luminaire 10 is devoid of any screw holes through the surface 43 of the lens element 45. The reflective surface 49 of the reflector 19 is also carefully formed and highly specular for maximum reflectivity.

A one-piece unobstructed lens element 45, shaped somewhat like an inverted cup, has a top 51, a cylindrical side wall 53 and a diameter substantially equal to that of the housing. A preferred lens element 45 is made of clear, high impact resistant polycarbonate plastic material. A coating 55, e.g., paint, is applied to the interior surface 43 of the top 51 to occlude or prevent the entry of light and present a more attractive appearance. Since such coating 55 (which can be colored for architectural or aesthetic purposes) may fade over time in sunlight, the lens element 45 plastic material includes an ultraviolet (UV) inhibitor to protect such coating 55 from fading.

The described arrangement has at least two advantages. One is that the coating 55 is well protected from fading which would otherwise diminish the appearance of the luminaire 10. Another is that such coating 55, being on the interior of the lens element 45, is protected from abuse and physical damage by passers-by.

Such interior coating 55 is applied across the entirety of the interior surface 43 of the top 51 and extends downward a slight distance along the side wall 53. The boundary 57 of such coating 55, e.g., the "paint line," defines an annular upper edge 59 of the lateral light opening 11. The periphery 41 of the upper reflector 19 is substantially aligned with such upper edge 59 and the latter aids in defining the 70° "cutoff" of light described below.

The improved bollard luminaire 10 also has a number of other innovative features. For example, such luminaire 10 includes a tubular housing 33 which may be of any regular or irregular cross sectional shape. As used herein, "tubular" means such housing is hollow, at least near the upper lip 35, where it houses the main reflector 13. The electrical fixtures, e.g., the lamp 17 and its socket 31, wiring and associated circuitry 61, are located within the housing 33 and below the first lip 35. The lateral light opening 11 is above such housing 33 so that light directed toward the opening 11 is unobstructed by electrical wiring. Since the path between the light and the opening 11 is not blocked by such wiring or, for that matter, by support posts or the like, light is emitted by the luminaire 10 at a generally uniform intensity over a 360° area. And because the electrical fixtures are positioned within the housing 33, they are well protected from vandalism.

Figure 3:
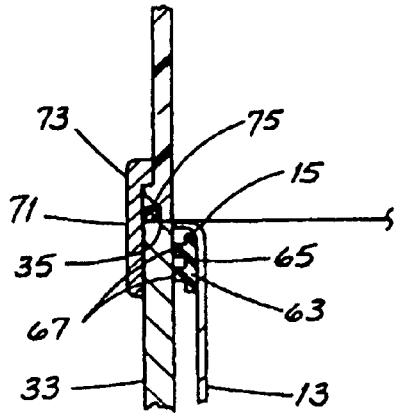
FIG. 3 is a greatly-enlarged view of a portion of the luminaire shown in FIG. 2, with parts broken away.

Referring also to FIG. 3, insects are invariably attracted to luminaires of all types. Unless special precautions are taken (as in the inventive luminaire 10), such insects may migrate to and pile up around the lamp and within the main reflector. Unless regularly cleaned out, such insects diminish the light output of the luminaire, are aesthetically unattractive and (under the right conditions) might even cause a fire hazard.

In the improved luminaire 10, a resilient barrier 63 is provided between the housing 33 and the main reflector 13. Specifically, such barrier 63 has an inner surface 65 which abuts and seals against the reflector 13 adjacent its top rim 15. Such barrier 63 has a pair of spaced, outwardly-extending "beads" 67 which seal against the inner surface of the housing 33 adjacent its first lip 35. Since the only area of insect entry into the luminaire 10 is around its base 69, insects are denied access to the light-reflecting surface 27 of the main reflector 13 as well as to the lamp 17 and the tubular portion 29.

Another potential problem attending the use of outdoor luminaires is water from, e.g., a hose or as rain or melted snow or sleet. To prevent water damage, the lens element 45 of the improved luminaire 10 has a second lip 71 along the first lip 35 of the housing 33 and such lips 35, 71 are in water-tight sealing engagement, thereby preventing entry of water. The second lip 71 preferably includes a retainer ring 73 bonded to the lens element 45 and positioned to extend downward to overlap the housing lip 35 when the lens element 45 is assembled to the housing. When so constructed, water flowing down the vertical side wall 53 of the lens element 45 flows over the retaining ring 73 and off of such ring 73 at locations below the housing lip 35. For added protection against water entry, the sealing engagement of the lens element 45 and the housing 33 is made redundant by a resilient silicon cord-type seal 75 captured between the lips 35, 71 and the ring 73.

The housing 33 is attached and supported to the underlying surface, e.g., a concrete pad, using a base casting 77. Such casting is normally pre-attached to such surface (when the pad is poured, for example) and has a shallow "pilot shoulder" 79 of a height just sufficient to guide the housing 33 into position. Prior to positioning the housing 33, the mounting frame 81 and socket mounting bracket 83 are attached for supporting the electrical fixtures and the main reflector 13. The housing 33 is attached to such casting 77 using a plurality of radially inwardly directed bolts.

FIG. 4 is what is known as a "ray trace" of the luminaire 10. Rays 85 from the light source, e.g., a lamp, strike the elliptical surface 27 of the main reflector 13, are reflected upward, strike the upper reflector 19 and are reflected laterally outward from surface 49 of such upper reflector 19. The reflected light, identified as rays 85a and laterally directed through the light opening 11, is greatest at an angle of about 70° from vertical, thereby providing illumination over a broad 360° area. As further described below and in a highly preferred embodiment, the lobe defined by such reflected light 85a is relatively sharply concentrated at 70°.

The upper focal point 23 of the main reflector 13 is positioned above such upper reflector 19 so that light from the main reflector 13 is received on the upper reflector 19 in an area called the convergence area 87. In a preferred embodiment, the lamp 17 is substantially at the lower focal point 25 of the main reflector 13. When the improved luminaire 10 is so constructed, the convergence area 87 on the upper reflector 19 is ring-like in shape and somewhat closer to the apex 89 of the reflector 19 than to its periphery 41. As shown in FIG. 1, the relative positions and spacing of the reflectors 13, 19 is such that the interior lens volume is relatively empty.

A primary purpose of bollard luminaires is to illuminate nearby sidewalks, grassy areas and the like. However, in many situations, "uplighting" is also desired to softly illuminate architectural features or foliage above the luminaire. Accordingly, the main reflector 13, the upper reflector 19, the lamp 17 and the lens element 45 are configured and arranged such that some light rays 91 emitted by the lamp 17 are directed upward and outward near the annular upper edge 59. Such rays 91 do not strike either reflective surface 27, 49 but, rather, exit the luminaire 10 at the upper portion of the light opening 11.

Figure 5:
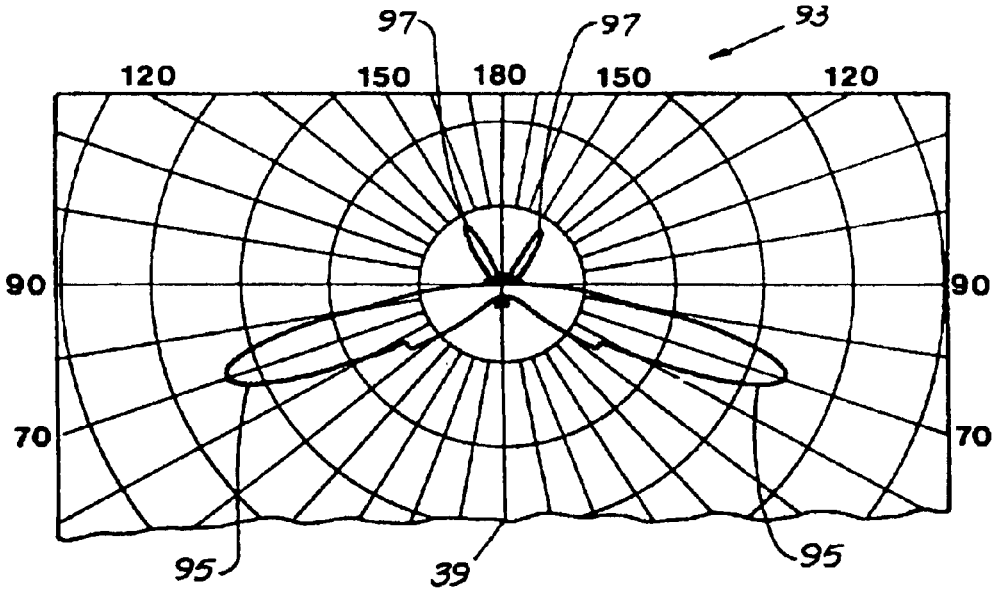
FIG. 5 is a candlepower trace in the vertical plane of the light pattern of the luminaire of FIG. 1.

FIG. 5 is known as a candlepower trace 93 in the vertical plane. That is, it is a view normal to a vertical plane which includes the central longitudinal axis 39 of the luminaire 10. Such trace 93 shows the pattern of light emitted by the luminaire 10. It will be noted there is a lobe 95 at about 70° from the vertical and such lobe 95 results from the rays 85a shown in FIG. 4. It is also to be noted there is a small upwardly-directed lobe 97 which results from the rays 91 emitted near the annular edge 59, such rays 91 also being shown in FIG. 4. It is to be appreciated that in actuality, the lobe 95 is symmetrical about the axis 39 and somewhat umbrella-shaped. The lobe 97 is likewise symmetrical about such axis 39 and shaped somewhat like an upstanding, wide-mouthed cup.

The improved luminaire 10 is highly efficient. It has been found that at distances from the luminaire 10 of from 3 to 7 mounting heights (horizontal distance as multiples of luminaire height), the luminaire 10 puts significantly more light on the ground that prior luminaires.

While the principles of this invention have been described in connection with specific embodiments, such embodiments are to be considered exemplary and the invention is not to be limited thereby.

We claim:

1. A bollard luminaire including:

*a tubular housing terminating upwardly in an annular lip;*

*a lens element having an annular bottom portion, the bottom portion being secured to the housing at the annular lip and providing* a 360° lateral light opening *thereabove*;

an upwardly directed main reflector having a top rim below such opening;

a lamp positioned below such rim; *and* an upper reflector [receiving] *secured proximate the lens element, the upper reflector positioned and configured to receive* light from the main reflector and [reflecting] *reflect substantially all* such *received* light at an angle less than 90° from vertical;

whereby such reflected light is directed laterally through such opening for ground illumination.

2. The luminaire of claim 1 wherein such main reflector has an upper focal point.

3. The luminaire of claim 2 wherein the upper focal point is positioned above the upper reflector, whereby light from the main reflector is received on the upper reflector in a convergence area.

4. The luminaire of claim 3 wherein:

such main reflector is elliptical and has a lower focal point; and the lamp is substantially at such lower focal point whereby such convergence area on the upper reflector is ring-like.

5. The luminaire of claim 1 wherein the reflected, laterally directed light is greatest at an angle of about 70° from vertical, thereby providing illumination over a broad 360° area.

6. The luminaire of claim 1 further including a one-piece unobstructed lens element having a light occluding top and a coating on an interior surface of such lens element, whereby such coating is protected from physical damage.

7. The luminaire of claim 6 wherein such lens element includes a UV inhibitor whereby such coating is protected from fading.

8. The luminaire of claim 1 wherein:

such main reflector is elliptical and has a lower focal point; and the lamp is substantially at such lower focal point whereby light emitted by such lamp is reflected upwardly onto the upper reflector in a ring-like convergence area.

*9. The luminaire of claim 1 wherein such main reflector is elongate and extends upwardly to the annular top lip to terminate at the lateral light opening.*

*10. The luminaire of claim 9 wherein the upper reflector has a downwardly-facing conical surface and includes a downwardly-facing reflective surface configured so that the reflected light is reflected in a laterally downward direction.*

*11. The luminaire of claim 1 wherein the upper reflector has a downwardly-facing conical surface and includes a downwardly-facing reflective surface configured so that the reflected flight is reflected in a laterally downward direction.*

*12. A bollard luminaire including:*

*a tubular housing terminating in an annular lip;*

*a lens element having an annular bottom portion, the bottom portion being secured to the housing at the annular lip and providing a 360° lateral light opening thereabove;*

*a mounting frame;*

*an upwardly directed main reflector and a socket each separately secured with respect to the mounting frame, the main reflector having a top rim below such opening;*

*a socket secured with respect to the mounting frame;*

*a lamp in the socket, the socket and lamp being positioned such that the lamp is positioned below the rim; and*

*an upper reflector secured proximate the lens element, the upper reflector positioned and configured to receive light from the main reflector and reflect such light at an angle less than 90° from vertical*

*whereby such reflected light is directed laterally through such opening for ground illumination.*

*13. The luminaire of claim 12 wherein such main reflector has an upper focal point.*

*14. The luminaire of claim 13 wherein the upper focal point is positioned above the upper reflector, whereby light from the main reflector is received on the upper reflector in a convergence area.*

*15. The luminaire of claim 14 wherein:*

*such main reflector is elliptical and has a lower focal point; and*

*the lamp is substantially at such lower focal point whereby such convergence area on the upper reflector is ring-like.*

*16. The luminaire of claim 12 wherein the reflected, laterally directed light is greatest at an angle of about 70° from vertical, thereby providing illumination over a broad 360° area.*

*17. The luminaire of claim 12 further including a one-piece unobstructed lens element having a light occluding top and a coating on an interior surface of such lens element, whereby such coating is protected from physical damage.*

*18. The luminaire of claim 17 wherein such lens element includes a UV inhibitor whereby such coating is protected from fading.*

*19. The luminaire of claim 12 wherein:*

*such main reflector is elliptical and has a lower focal point; and*

*the lamp is substantially at such lower focal point whereby light emitted by such lamp is reflected upwardly onto the upper reflector in a ring-like convergence area.*

*20. The luminaire of claim 12 wherein such main reflector is elongate and extends upwardly to the annular top lip to terminate at the lateral light opening.*

*21. The luminaire of claim 20 wherein the upper reflector has a downwardly-facing conical surface and includes a downwardly-facing reflective surface configured so that the reflected light is reflected in a laterally downward direction.*

*22. The luminaire of claim 12 wherein the upper reflector has a downwardly-facing conical surface and includes a downwardly-facing reflective surface configured so that the reflected light is reflected in a laterally downward direction.*

* * * * *